United States Patent [19]

Hwang

[11] Patent Number: 5,785,106
[45] Date of Patent: Jul. 28, 1998

[54] SUNSHIELD AND METHOD OF MANUFACTURE OF SUNSHIELD

[76] Inventor: Charles Hwang, 1714 Stoner Ave. Unit #9, Los Angeles, Calif. 90025

[21] Appl. No.: 751,905

[22] Filed: Nov. 18, 1996

Related U.S. Application Data

[60] Division of Ser. No. 423,818, Apr. 19, 1995, Pat. No. 5,575,324, which is a continuation-in-part of Ser. No. 419,956, Apr. 7, 1995.

[51] Int. Cl.⁶ .................................................. B60J 3/00
[52] U.S. Cl. .................................. 160/370.21; 160/DIG. 2
[58] Field of Search .................. 160/370.21, 405, 160/DIG. 2, DIG. 3; 296/97.7, 97.8, 95.1

[56] References Cited

U.S. PATENT DOCUMENTS

| | | | |
|---|---|---|---|
| 2,599,066 | 6/1952 | Osborn | 160/370.21 |
| 4,635,993 | 1/1987 | Hooper et al. | 160/370.21 |
| 4,815,784 | 3/1989 | Zheng | 160/370.21 X |
| 5,024,262 | 6/1991 | Huang | 160/370.21 X |
| 5,035,460 | 7/1991 | Huang | 160/370.21 X |
| 5,116,273 | 5/1992 | Chan | 160/370.21 |
| 5,213,147 | 5/1993 | Zheng | 160/370.21 |
| 5,378,518 | 1/1995 | Wang | 160/DIG. 2 X |
| 5,452,934 | 9/1995 | Zheng | 296/97.7 |
| 5,553,908 | 9/1996 | Shink | 160/370.21 X |
| 5,575,324 | 11/1996 | Hwang | 160/370.21 |
| 5,611,380 | 3/1997 | Landy | 160/370.21 X |
| 5,628,357 | 5/1997 | Hwang | 160/370.21 |
| 5,632,318 | 5/1997 | Wang | 160/370.21 |

*Primary Examiner*—David M. Purol
*Attorney, Agent, or Firm*—Fulwider Patton Lee & Utecht, LLP

[57] ABSTRACT

A spring loop folding sunshield and method of manufacture in which a spring loop is enclosed within tape across the intermediate portion of the sunshield and around the edges of the sunshield. The tape is attached across the intermediate portion of the sunshield by creating two ridges across the intermediate portion of the sunshield and sewing or otherwise attaching a tape over the ridges. In one method of creating the ridges, the material is cut into two approximate halves, leaving an intermediate portion which is then sewn to the two approximate halves to create the ridges across the intermediate portion of the sunshield.

4 Claims, 7 Drawing Sheets

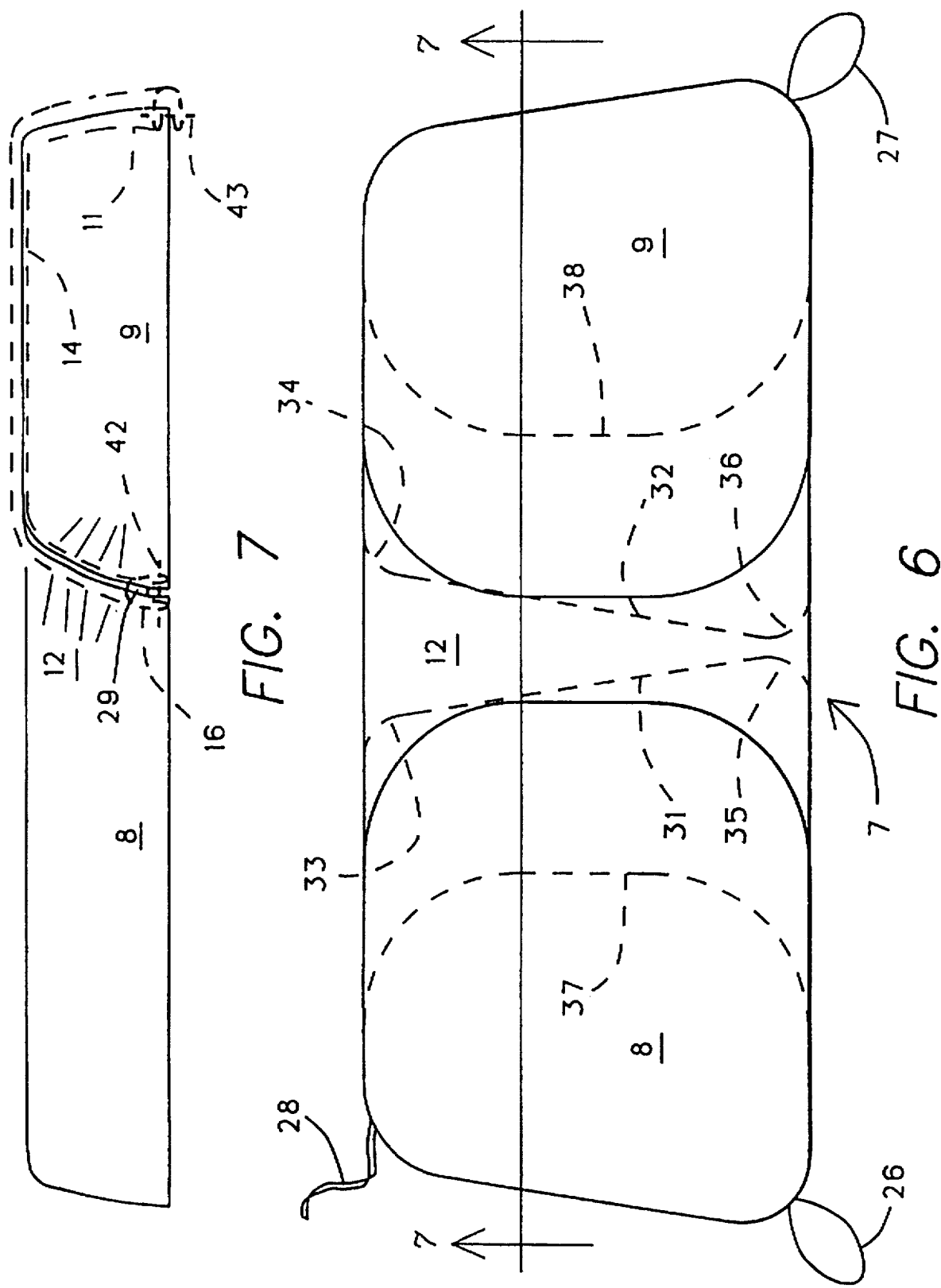

SUNSHIELD AND METHOD OF MANUFACTURE OF SUNSHIELD

This application is a divisional of U.S. Ser. No. 08/423, 818, filed Apr. 19, 1995, now U.S. Pat. No. 5,575,324, which is a continuation-in-part of co-pending U.S. Ser. No. 419, 956 filed Apr. 7, 1995.

This invention is a folding sunshield and method of manufacture of such sunshield having two or more spring loops which can be folded one on top of the other and then twisted to form a small configuration. Such sunshield is particularly useful in vehicles although it may also be used in homes, offices and other circumstances. The method of the invention is an efficient, cost-effective manner of manufacture of the sunshield. Also, the manufactured product is neat-appearing and aesthetically pleasing.

The invention, in its preferred embodiment, has two spring loops disposed apart on approximate halves of sunshield material, leaving an intermediate portion between the loops. Two elongated, flat narrow strips of material, tapes, are each sewn or otherwise attached to a respective ridge across the intermediate portion of the sunshield material. Each tape is sewn or otherwise attached over a respective ridge, along said ridge, and each tape continues and is sewn or otherwise attached around the remainder of a respective approximate half of the sunshield material. Each tape contains a spring loop and attaches such spring loop to the sunshield material.

The problem solved by the invention is how to sew or otherwise attach the tape across the intermediate portion of the sunshield and to the remainder of the sunshield.

PRIOR ART

The prior art comprises the manufacture of a similar, folding automobile sunshield having two or more loops. The methods of manufacture, in the past have included laying two spring steel loops, a spaced distance apart, on a single layer of sunshield material and attaching the spring steel loops to the material by rolling the edge of the material over the spring steel loops or otherwise attaching a tube to the material and enclosing the spring steel loops within such tube. The intermediate material occupying the spaced distance between the two spring steel loops serves as a hinge between the two spring steel loops so that they may be folded one on top of the other. Then, the two loops, and the entire sunshield, are twisted into a final, multiple-loop, compact configuration substantially smaller than the sunshield or either loop of the sunshield. U.S. Pat. No. 4,815, 784 for Automobile Sunshield illustrates such a method.

In one prior art method of manufacture, two tapes, each forming a loop, are sewn to the sunshield material and enclosing a spring steel loop. Each tape is first sewn to the material, say, on the inside of the loop, and then the tape is sewn to the material on the outside of the loop. A spring steel loop is captured within each of the tapes by such sewing. This embodiment is most often manufactured using a single needle sewing machine sewing each of the loops of tape to the sunshield material by making two passes around each loop, one pass inside the spring steel and one pass outside the spring steel. This two-pass method requires twice as much sewing time as if a single pass could be made, as in the invention. In the prior art, a double-needle sewing machine could be used to make one pass in sewing the tape to the material along both sides of each of the spring steel loops, but double-needle machines are expensive and difficult to operate without breaking needles and are not nearly as common as single needle machines.

In another method of manufacture, the tapes are sewn in place, in the form of two loops, leaving an opening in each loop in which to thread one end of a length of spring steel. After the spring steel is completely threaded through the tape loop, the ends of the spring steel are connected together, such as by crimping or otherwise. The opening in each loop may then be closed by sewing it shut.

In some of the prior art methods of manufacture, an additional tape is sewn around the edge of the material, which extends beyond the spring steel loops at most or all locations. Both of the above methods requires more bias tape than the preferred method and preferred embodiment of the invention.

In another method of manufacture, a double layer of material is used for the sunshield and the spring steel loops are enclosed and sewn between the layers. The requirement for a double layer of sunshield material makes this an expensive method.

Other materials than spring steel, such as a springy plastic, other metals or compounds thereof, have been proposed and, of course, may be used, for the spring loops.

BRIEF SUMMARY OF THE INVENTION

In the preferred method and embodiment of the invention, two spring steel loops are attached to the sunshield material on approximate halves of such sunshield material. The sunshield material is preferably a woven nylon. However, other woven fabrics may be used as may meshes, non-woven fabrics, sheet material, mylar, polypropylene and other film, of single or multiple layers, or other material to which a tape may be sewn, adhered, heat-sealed or otherwise attached. The sunshield material may be uncoated or coated with one or more of various paints, finishes and metals, including particularly, but not limited to, a very thin coating of aluminum which may then be covered by a thin, transparent plastic coating of polyvinyl, polyethylene or other material for durability.

Preferably, the spring steel loops have their outer portions along the outer ends of the sunshield material, as shown in FIG. 6 of U.S. Pat. No. 4,815,784. The intermediate portion of the sunshield material, between the spring steel loops, acts as a hinge between the two spring steel loops, just as in the prior art.

In the preferred embodiment of the sunshield of the invention, each tape is sewn around the outer edge of one end of the sunshield material. Each tape continues across the intermediate portion of the sunshield by being sewn to a respective ridge of sunshield material, extending across such sunshield material. Thus, each tape extends across the intermediate portion of the sunshield and continues around one end of the sunshield. Each tape contains a spring loop which may be of metal or other, suitable, foldable and twistable, spring-like material.

Bias tape is the preferred tape sewn to the sunshield, however, any durable, strip of material may be used. Bias tape is well-known in the sewing industry. "Bias" refers to a material cut diagonally of the "grain" or "weave" of the material but not lengthwise nor crosswise which allows more unraveling. "Bias tape" means an elongated narrow strip of such diagonally-cut material whose sides are folded within itself to form a nice, finished appearance when sewn in place, with no edges of any of the materials showing. When an article is completed, with bias tape attached, only folded edges show. Although bias tape is preferred, any suitable width of material may be used and may be folded within itself as is the usual bias tape or may not be so folded, as desired. The tape material may be woven or non-woven fabric or other material. Such tape material may even be a film or sheet of mylar, polyethylene, polypropylene, polyvinyl, or other plastic or any other suitable, flexible, durable material, of single layer or multiple layers of the same or differing materials, that can withstand folding and unfolding numerous times and is strong enough to receive and hold the spring loop over the life of the sunshield. Further, such tape material may be coated or uncoated with various other materials, including, but not limited to aluminum and other metals, as may the sunshield material.

The term "tape" is intended to include any of such material which can be suitably sewn, heat-sealed, glued or otherwise adhered or otherwise attached to the sunshield material and enclose the spring loop.

This invention is primarily concerned with how to combine the tape and spring loop with the material of the sunshield across the intermediate portion of the sunshield and around the edges of the sunshield. This is accomplished by forming the sunshield material into a plurality of ridges which cross the intermediate portion of the sunshield material and tapes are sewn or otherwise attached over the edges of such ridges, along such ridges. In the preferred method of manufacture, a spring loop is placed inside the tape as it is sewn over the edge of the ridge.

Thus, across the intermediate portion of the sunshield, if sewing is used, the tape is not sewn through the sunshield to the opposite side of the sunshield, as in the prior art, but is sewn, on one side of the sunshield, across the ridge formed. If gluing or heat sealing is used, for example, the tape is heat-sealed to the sunshield material which is heat-sealed, or otherwise attached, to itself to hold the ridge in place.

The method is repeated for the other loop, creating a sunshield having two spring loops, one of which may be folded on top of the other and then the two are twisted into a small, compact configuration for stowing. U.S. Pat. No. 4,815,784, for Automobile Sunshield discusses and shows clearly, in FIG. 12(A) through FIG. 13, how such spring loops are folded on top of each other and then twisted into their final, multiple-loop configuration for stowing. Such folding and twisting is well-known to those skilled in the art.

It is, therefore, an object of this invention to provide a method of manufacture of a folding sunshield having two or more spring loops.

It is another object of this invention to provide an easier method of manufacture of a folding sunshield.

It is still another object of this invention to provide an economical method of manufacture of a folding sunshield.

Still another object of this invention is to provide a sunshield having loops, whose loops extend to the outer extremities of the sunshield material.

A still further object of this invention is to provide a folding sunshield that is aesthetically pleasing.

BRIEF DESCRIPTION OF THE DRAWINGS

Further objects and features will become apparent from the following description in which:

FIG. 6 is a view of the sunshield of the invention.

FIG. 7 is a partial perspective view taken on the line 7—7 in FIG. 6, showing an alternate method of manufacture.

DETAILED DESCRIPTION

Figure 1:
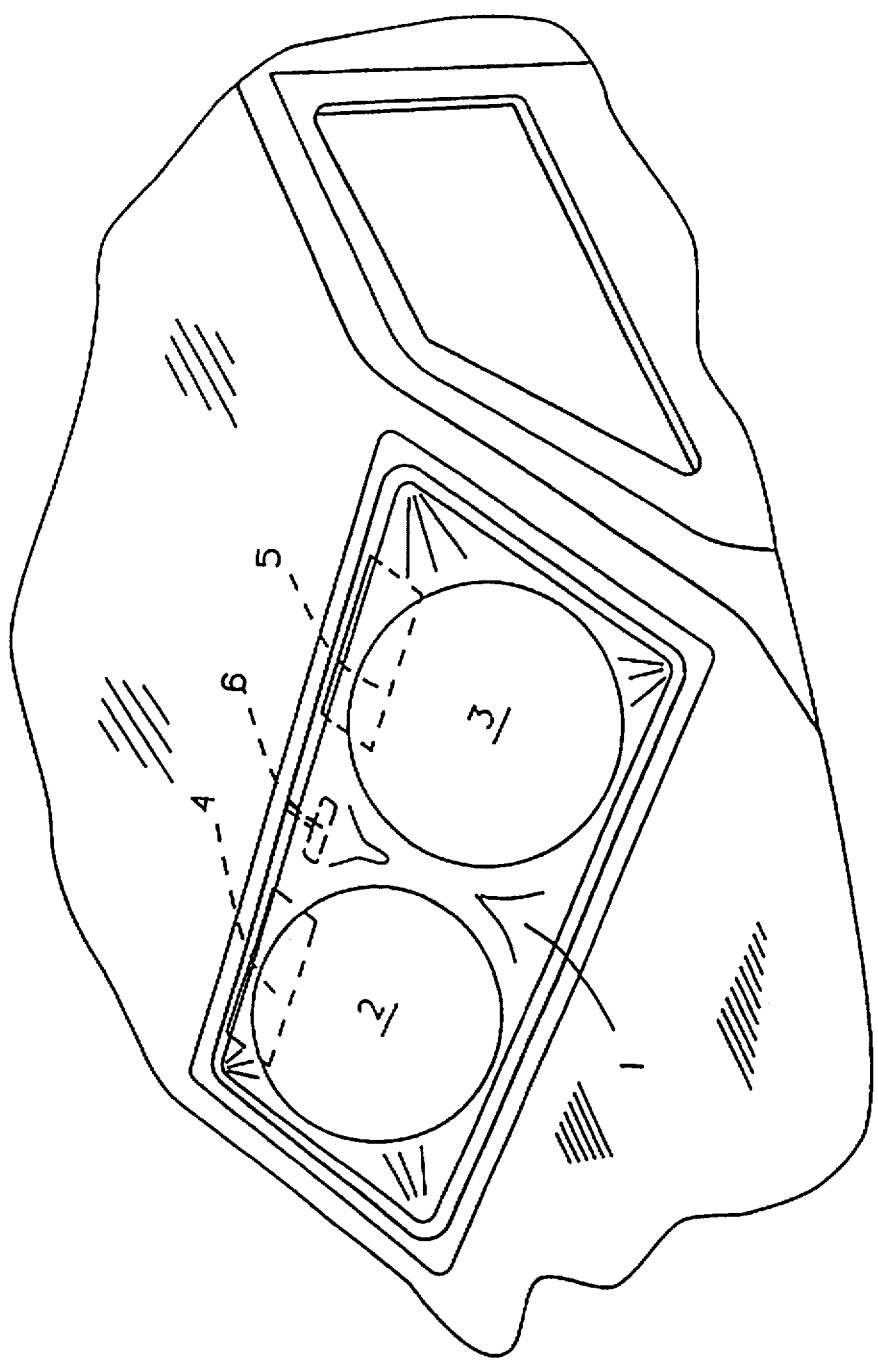
FIG. 1 is a view of a prior art sunshield in the windshield of an automobile.

In FIG. 1 a prior art sunshield 1 having spring loops 2 and 3 are shown in the windshield of an automobile. Such prior art sunshield may be assisted in being held in place by the visors 4 and 5 and mirror 6.

Figure 2:
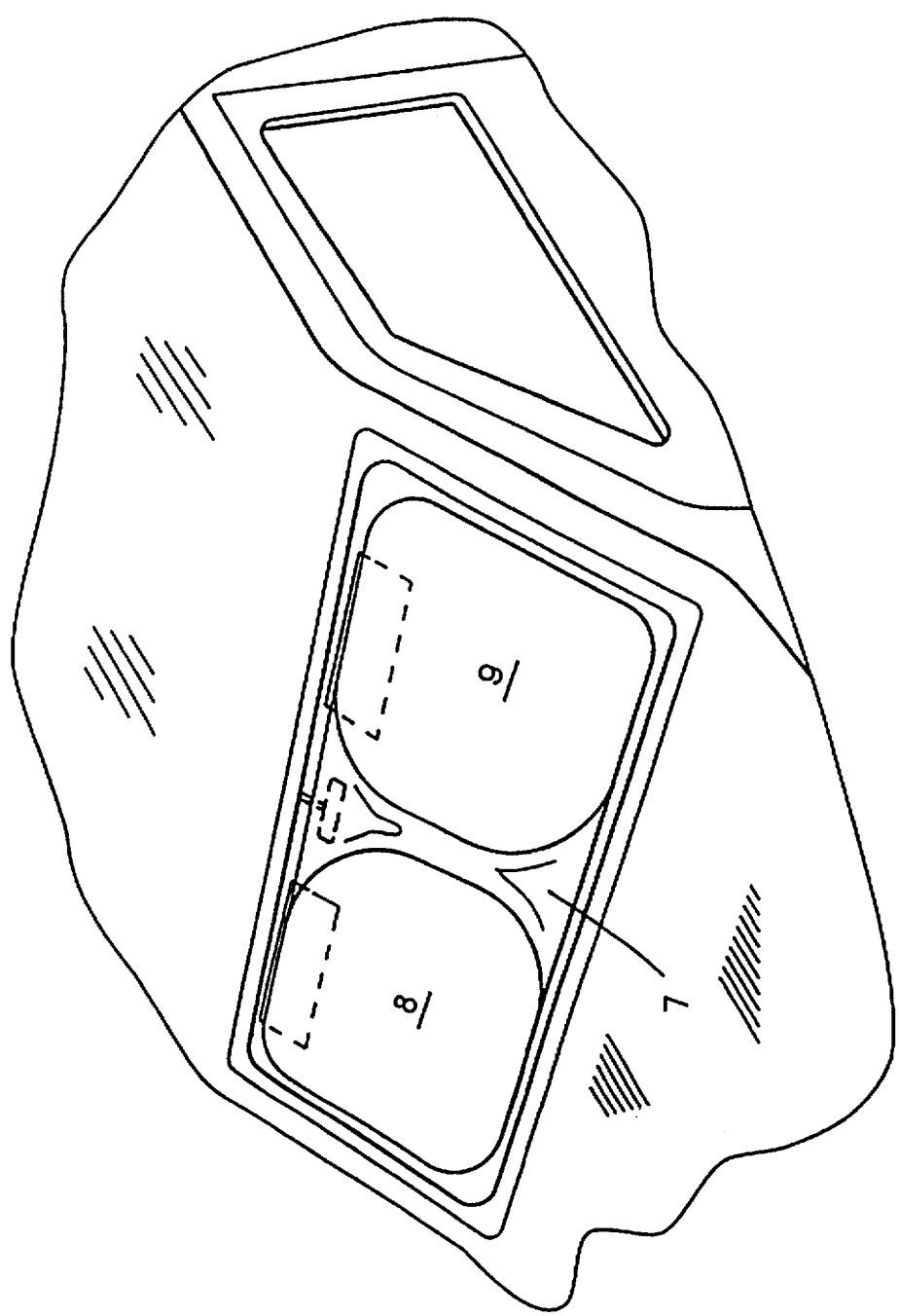
FIG. 2 is a view of the sunshield, made in accordance with the invention, in the windshield of an automobile.

FIG. 2 is a view of the sunshield 7, having loops 8 and 9 made in accordance with the invention, in the windshield of an automobile.

Figure 3:
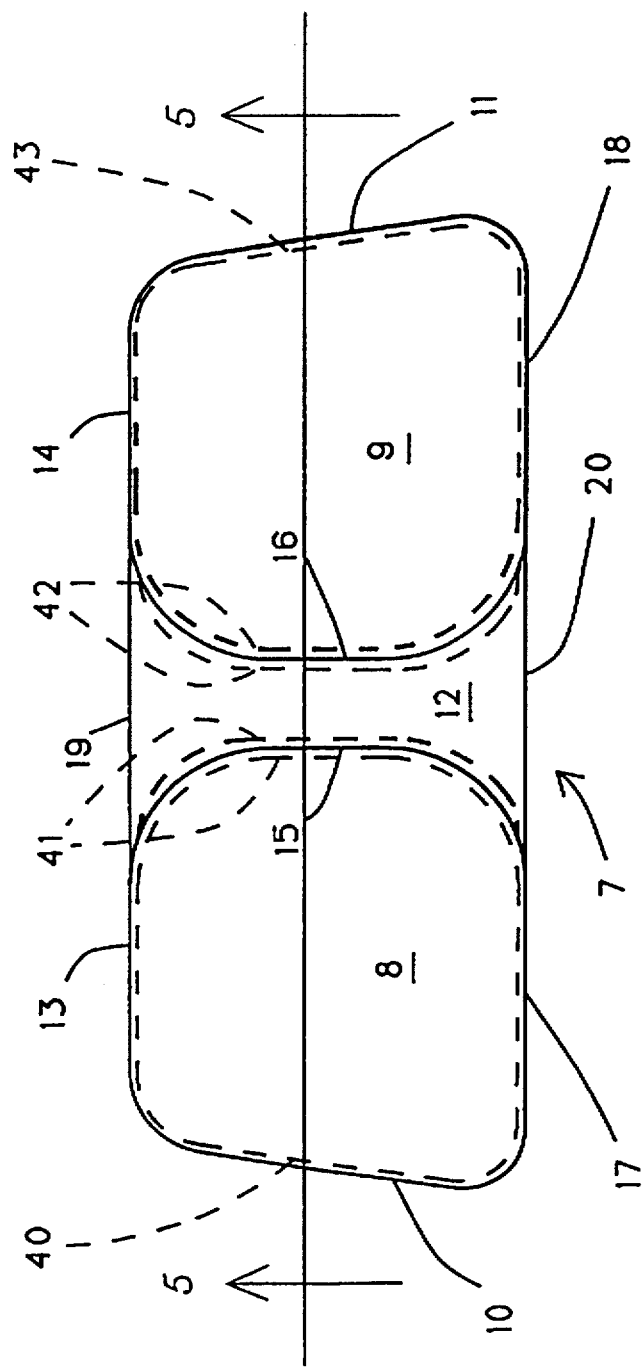
FIG. 3 is a view of the sunshield of the invention.

In FIG. 3, a sunshield 7, a sunshield of the invention, has tapes 10 and 11 sewn around the edges of the left and right ends of the sunshield. As previously explained, such tapes may be glued, heat-sealed or otherwise attached to such edges. It is noted that the tapes 10 and 11 continue as tapes 13 and 14 along the top edges of the loops 8 and 9. Tapes 13 and 14 then continue as tapes 15 and 16 across the intermediate portions of the loops 8 and 9, respectively. The tapes 17 and 18 continue along the bottom edges of the sunshield, completing each of the loops 8 and 9 within which a spring loop member is contained. That is, the each spring loop is contained within the tapes encircling loops 8 and 9. Additional tape 19 is sewn, or otherwise attached, along the top edge of the intermediate portion 12. The ends of such tape 19 is terminated shortly within either the tapes 13 and 14 or tapes 15 and 16, or at the convergence of such tapes. Likewise, tape 20 is also sewn, or otherwise attached, along the bottom edge of the intermediate portion 12. The ends of such tape 20 is terminated shortly within either the tapes 17 and 18 or tapes 15 and 16, or at the convergence of such tapes.

In the embodiment of FIG. 3, stitching 40 and 43, shown in dotted lines, attach tapes 10 and 11 to the left and right ends of loops 8 and 9. Such stitching 40 and 43, shown in dotted lines, also attach the tapes 13, 14, 17 and 18 to the top and bottom edges of the loops 8 and 9 of the sunshield 7. Such stitching 40 and 43 is through the sunshield, from the top to the bottom of the sunshield. However, as shown by the stitching 41 and 42, shown in dotted lines, the stitching across intermediate portion 12 is not from top to bottom of the sunshield but, rather, lies horizontally through the ridges created for tapes 15 and 16. Such stitching 41 and 42 and tapes 15 and 16, across the intermediate portion 12, are, preferably, continuations of the stitching 40 and 43 and tapes 10 and 11 around the edges of the left and right ends of loops 8 and 9. That is, in the preferred embodiment, loop 9 is encircled by a continuous tape and continuous stitching and loop 8 is likewise encircled by continuous tape and continuous stitching. Loops 8 and 9 thus appear to stand out from the sunshield 7, particularly across the intermediate portion 12 of the sunshield.

To complete the perimeter of the sunshield, entirely encircling it by tape, tapes 19 and 20 are, in the embodiment of FIG. 3, sewn to the top and bottom edges of the intermediate portion 12 of the sunshield and terminated as previously explained.

It is to be appreciated that while a single tape may be sewn around loop 8 and a single tape may be sewn around loop 9, as expedient, such tape may be pieced together from two or more sections of tape and such stitching may be terminated and resumed at various locations. A ⅜" bias tape, that is, one which forms a ⅛" border on the sunshield, has been found suitable and aesthetically pleasing. Such bias tape is constructed of material approximately 1⅜" wide. When sewn in place the bias tape is ⅜" wide and has a margin of a ¼" or slightly more tucked under and inside the tape, along its length on both its sides, thus making it what is commonly called "bias tape".

It is to be appreciated that a sunshield material of a thermoplastic film and a tape of thermoplastic film might be heat-sealed rather than sewn. Instead of sewing, glue or other adhesive, may be used to hold a tape and the edges of the sunshield material in place. In some instances, heat sealing or other sealing, catalytic or chemical bonding of the tape to the sunshield material may be used. Such other methods may also be used in forming the ridges 15 and 16 which cross the intermediate portion of sunshield 7.

The spring loop of the invention is preferably made of zinc-coated, spring steel and in cross-section is a rectangle approximately ⅛" high and approximately 1/32" or less in width. A width of approximately 1/48" is commonly used. Of course, stronger or weaker spring steel may require somewhat different dimensions to appropriately hold the sunshield in place and to be easily folded and twisted for storage. The dimensions would be inverse to the strength of the steel, that is, as the steel is stronger, the dimensions may be smaller.

Figure 4:
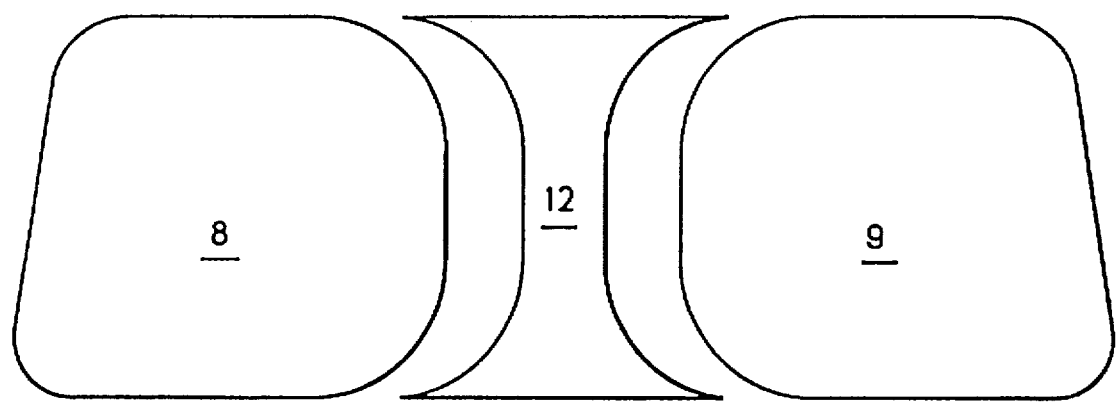
FIG. 4 is a view of the sunshield material cut into three portions process of manufacture.

The spring loop may be any of numerous shapes including, but not limited to, circular, elliptical, rectangular, square, trapezoidal or rhombic as shown in FIGS. 3 and 4. The preferred shape is that shown in FIGS. 3 and 4.

FIG. 4 is a view of the sunshield material, cut into three portions, loops 8 and 9 and intermediate portion 12, in the process of manufacture. Such three portions are then brought together to form the ridges shown in cross-section in FIG. 5. Such ridges are then sewn together through the tapes with the tapes overlying the ridges.

Manufactured in this manner, the two loops of the sunshield create a pleasing, workmanlike, artistic appearance, making the two loops 8 and 9 pleasingly seeming to "stand out" against the background of the sunshield material.

Figure 5A:
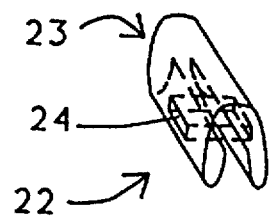
FIG. 5A is a view of a jig used in sewing the sunshield.
Figure 5:
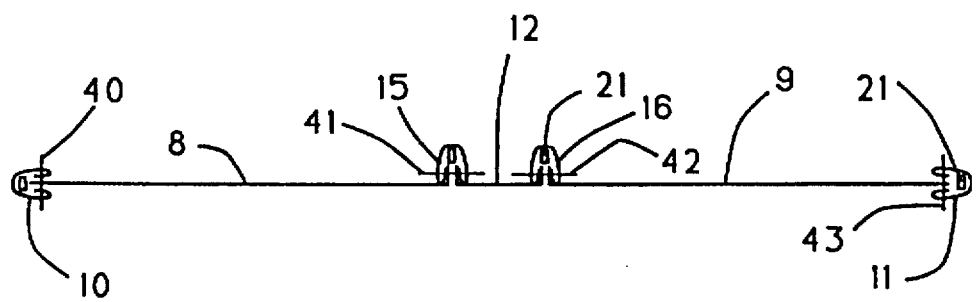
FIG. 5 is a cross-section view taken on line 5—5 of FIG. 3 showing the two ridges in the intermediate portion of the sunshield and how the tape is sewn across the two ridges and the two ends of the sunshield and over the edges of the ends.

FIG. 5 is a cross-section view taken on line 5—5 of FIG. 3 showing the two ridges formed by the intermediate portion 12 of the sunshield and the loop portions 8 and 9 and how the tapes 15 and 16 are sewn overlying, or across, the two ridges. Tapes 15 and 16 are shown relatively enlarged for clarity. Such tapes continue to the top and bottom edges of the sunshields, as shown in FIG. 3, and complete the two loops 8 and 9 by being sewn, shown as tapes 10 and 11, which are also shown relatively enlarged for clarity, in FIG. 5, around the edges of the ends of the sunshields. Stitching 40, 41, 42 and 43 illustrate how the tapes are sewn to the edges and to the ridges of the sunshield material.

In the preferred embodiment, the spring loop 21 is caught and held within the tape as it is sewn in place over the ridges as well as when it is sewn in place around the edges of the left and right ends of the loops 8 and 9. Alternatively to including the spring loop into the tape at the same time the tape is sewn on the ridges and edges, a length of spring loop material may be fed into the tape loop, after it is sewn in place, through a retained or prepared opening in the tape loop. The length of spring loop material is then connected at its ends to form a loop and the tape opening is then closed over the spring loop. Various means of connecting the ends of the spring loop together may be used such as by crimping the ends together, butt-joining, overlap-joining, welding, soldering, brazing or by other suitable joining methods or means.

FIG. 5A is a view of a jig 22, used in sewing the sunshield. The edges of intermediate portion 12 and loop 9 of sunshield material, for example, of FIG. 4, are fed into the end 23 of jig 22 and emerge from the near end of jig 22. The tape material is also fed into end 23 of the jig 22 at the same time and formed into a bias tape by the jig. The sewing needle passes through window 24 in the jig 22, catching both the edge of intermediate portion 12 and the edge of loop 9. The spring loop 21 is preferably also be fed into jig 22 at the same time, so that the spring loop is captured within the bias tape as it is sewn in place.

Of course, the sewing needle may be located to sew the bias tape and sunshield material subsequent to the bias tape and the sunshield material passing through jig 22, that is, after the near end of the jig 22, after the bias tape and material are formed in place by the jig 22.

FIG. 6 is a view of the sunshield 7 of the invention having elastic loops 26 and 27 for holding the sunshield when it is folded and one or more attaching means such as strap 28. Straps may be used to tie the sunshield in place or hold it in place by extending through a closed window or between a closed door and its frame.

Loops 26 and 27 for holding the sunshield when folded and twisted for storage, may be tape, cord or elastic, as desired, and may be connected to the corners, sides or edges of the sunshield 7. Also, strap 28 which may also be a tape, cord, elastic or other flexible material, and similar straps may be attached to the corners, sides or edges of the sunshield 7.

Also, the loops 8 and 9 of the sunshield may have other configurations. Dotted lines 31 and 32, representing tape including therein the spring loop, which is not shown, illustrate the embodiment in which loops 8 and 9 are comprised of a long, linear line running across the intermediate portion 12 of the sunshield 7. Such dotted lines 31 and 32 then end in curves 33, 34, 35 and 36 near the top and bottom edges of the sunshield 7.

Another configuration which results in smaller loops, when the sunshield 7 is folded and twisted into its smallest shape, is illustrated by dotted lines 37 and 38, representing the tape, within which is disposed the spring loop 21, of loop 9 and a corresponding spring loop, which is not shown, of loop 8. In this embodiment, the intermediate portion 12 is quite large and may be folded away inside the two loops 8 and 9, as they are formed into their smallest configuration.

FIG. 7 is a partial perspective view taken on the line 7—7 in FIG. 6, showing an alternate method of manufacture. In this method of manufacture, the intermediate portion 12 is not cut away from the loops 8 and 9 as shown in FIG. 4, but, rather, the portion 12 is gathered together with a portion of loop 9 to form a ridge 29, which may or may not be then sewn to hold it for later sewing a tape 16 thereover, as shown in FIG. 5. Stitching 42 illustrates the location of the stitches as being horizontally through the material, across the intermediate portion 12 of the sunshield. Thus, tape 16, shown in dotted lines, is, in the intermediate portion 12 of the sunshield, sewn over a gathered, or formed, ridge 29. As described previously, tape 16, shown in dotted lines, is preferably a continuation of tape 14 and tape 11, both shown in dotted lines in FIG. 7. The stitching of such tapes 16, 14, and 11 to the loop 9 is shown and explained in connection with FIGS. 3 and 5.

In FIG. 7, spring loop 21 is not shown, but it is included within the tapes 11, 14, 16 and 18 shown in FIG. 3. A similar spring loop, not shown, is included within the tapes 10, 13, 15 and 17.

Figure 8:
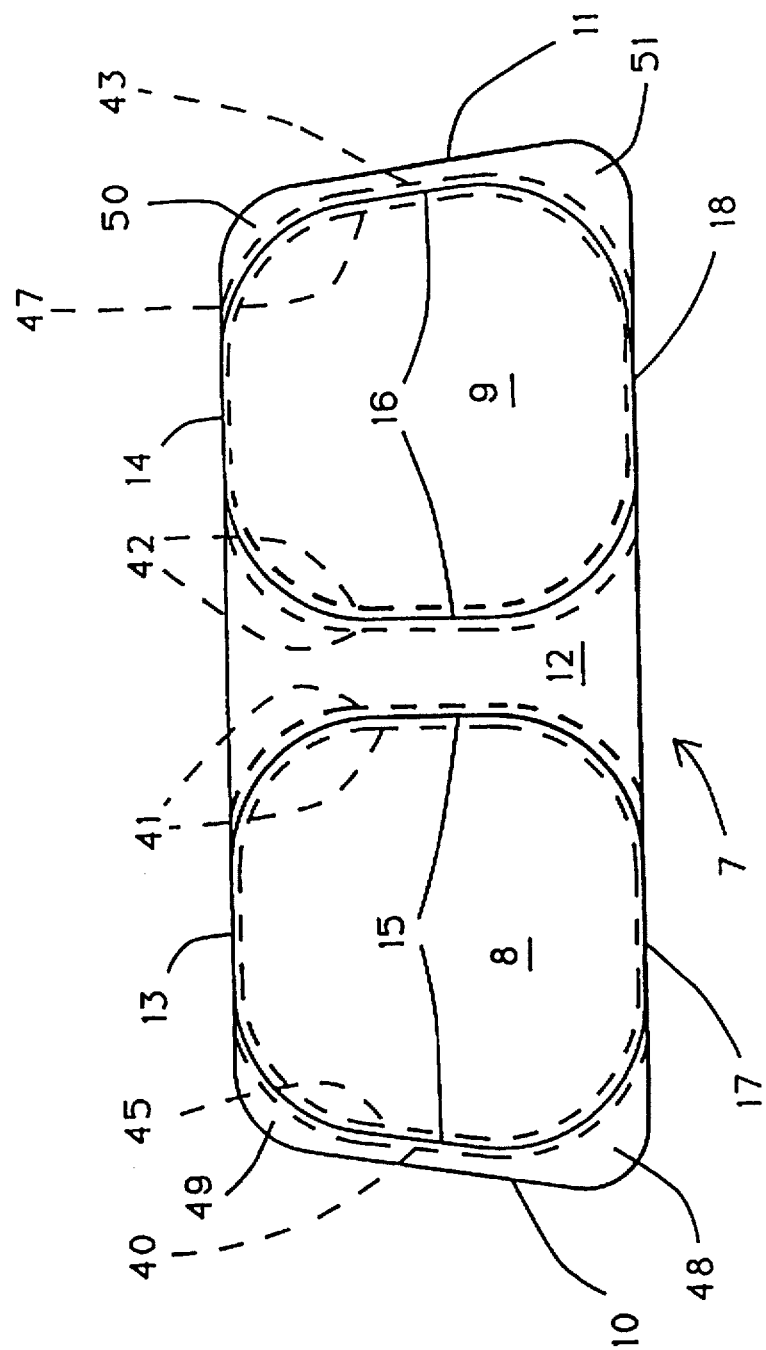
FIG. 8 is a view of a sunshield in which the spring loops do not extend around the outside edges of the sunshield.

FIG. 8 is a view of a sunshield 7 in which the spring loops do not extend around the outside edges 10 and 11 of the sunshield. Nevertheless, the inner portions of the spring loops extend across the intermediate portion 12 of the sunshield and are captured by tapes 15 and 16 by sewing 41 and 42, respectively. Such sewing 41 and 42 are through the ridge as explained previously, and as shown in FIG. 8, and attach the tapes 15 and 16 to the ridges. Across the intermediate portion of the sunshield 7, the spring loops are contained within the tapes 15 and 16. The outer portions of the spring loops, in extending around the remainder of each approximate half, do not extend to the edges of the sunshields, in this embodiment, but are contained within the tapes 15 and 16 sewn to one side of the sunshield material. Sewing 40 and 43 on the outer edges of tapes 15 and 16 are sewn through the sunshield material from front to back. Sewing 45 and 47 on the inner edges of tapes 15 and 16 are sewn through the sunshield material from front to back. Thus, loops 8 and 9 have their inner portions created by tapes 15 and 16 running along a respective ridge and their outer portions created by tapes 15 and 16 simply being sewn to the sunshield material. Of course, tapes 15 and 16 may be attached by means other than sewing as previously discussed.

The embodiment of FIG. 8 provides small flaps 48, 49, 50 and 51 at the corners of the sunshield.

Figure 9:
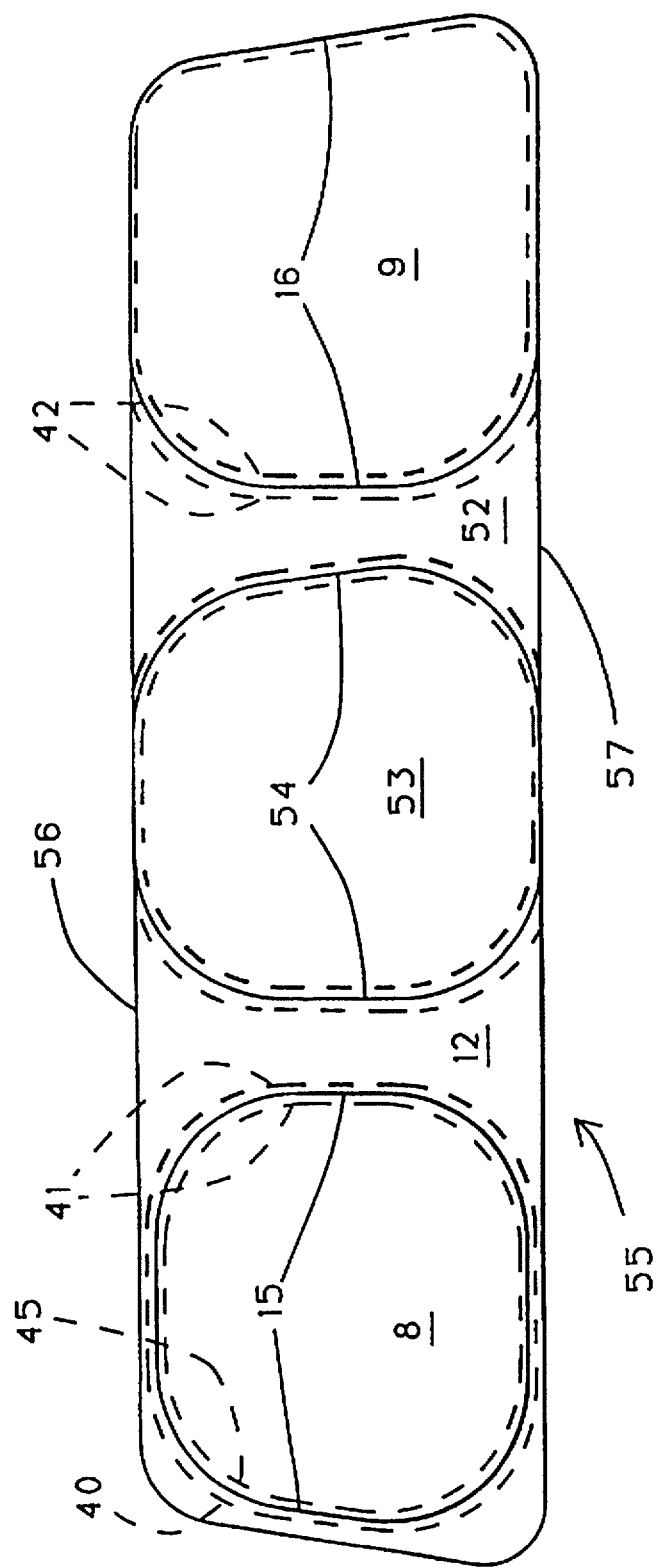
FIG. 9 is a view of a sunshield in which there are three spring loops.

FIG. 9 is a view of a sunshield 55 in which there are three spring loops. Such three loops are shown in different configurations as examples of how the tapes and spring loops therein might be attached to the sunshield material. Consequently, there are two intermediate portions 12 and 52 between the three loops 8, 53 and 9. A central loop 53 is bounded on both sides by an intermediate ridge across the sunshield which ridges are covered by tape 54, which, preferably, extends completely around loop 53. Such tape 54, may be comprised of sections of tape, or material, pieced together, just as may the other tapes in the construction of the sunshield. In this embodiment, loops 8 and 9 may be constructed and bounded the same as loops 8 and 9 in FIG. 8. However, loop 8 is shown constructed in a different manner. The inner portion of loop 8 is constructed as has been previously taught, by attaching tape 15 over a ridge formed of sunshield material. Sewing 41 illustrates that the sewing 41, shown on both sides of the tape 15 is the same. Yet, around the outside portion of loop 8, the tape 15 is sewn to the sunshield material without forming a ridge. Consequently, sewing 40 and sewing 45 are different sewings, sewn through to the backside of the sunshield material.

Similarly, loop 9 shows the version taught in FIG. 3, in which the tape 16 is sewn over the outside edge of the right end of the sunshield. It is to be appreciated that loops 8, 53 and 9 could be constructed by any of the examples shown in FIG. 9. Usually, loops 8 and 9 would be constructed similarly, whichever method is selected. The tapes 15, 16 and 54 may be sewn over the top edge 56 for a short distance and the bottom edge 57 for a short distance or may run along, near such top and bottom edges. In any event, a spring loop is contained within each of such tapes. It may be desirable to enclose the entire perimeter of the sunshield with another tape.

Although specific embodiments and certain structural arrangements have been illustrated and described herein, it will be clear to those skilled in the art that various other modifications and embodiments may be made incorporating the spirit and scope of the underlying inventive concepts and that the same are not limited to the particular methods and structure herein shown and described except insofar as determined by the scope of the appended claims.

I claim:

1. A sunshield for placement in a vehicle windshield for reflecting sunlight, comprising:

a continuous sheet of material having a first section and a second section with an intermediate section there between;

a first spring loop configured to correspond to the first section and a second spring loop configured to correspond to the second section;

forming a continuous ridge with a portion of the sheet of material adjacent the first spring loop and adjacent the second spring loop;

a first section of bias tape being attached to the ridge and covering the first spring loop and a second section of bias tape being attached to the ridge and covering the second spring loop;

whereby the first and second spring loops are attached to the first and second sections with the intermediate section there between.

2. The sunshield of claim 1, wherein a single-stitch pattern attaches the first section of bias tape to the ridge and the first spring loop, and the second section of bias tape to the ridge and the second spring loop.

3. The sunshield of claim 1, wherein the ridge includes a first ridge formed in the first section of the sheet of material adjacent the first spring loop and a second ridge formed in the second section of the sheet of material adjacent the second spring loop.

4. Method for forming a sunshield, the method comprising:

providing a continuous sheet of material having a first section and a second section with an intermediate section there between;

positioning a first spring loop on the first section and placing a second spring loop on the second section;

forming a continuous ridge with a portion of the sheet of material adjacent the first spring loop and adjacent the second spring loop;

folding a first section of bias tape over the ridge and the first spring loop, and folding a second section of bias tape over the ridge and the second spring loop; providing a single-stitch pattern to attach the first section of bias tape to the ridge and to the first spring loop, and using a single-stitch pattern to attach the second section of bias tape to the ridge and the second spring loop so that the first spring loop and the second spring loop are attached to the continuous sheet of material with the ridge forming an aesthetic appearance.

* * * * *